(12) United States Patent
Zimmerman et al.

(10) Patent No.: US 8,734,727 B2
(45) Date of Patent: May 27, 2014

(54) PLASMA MICROREACTOR APPARATUS, STERILISATION UNIT AND ANALYSER

(75) Inventors: William Bauer Jay Zimmerman, Sheffield (GB); Jaime Humberto Lozano Parada, Bucaramanga (CO)

(73) Assignee: Perlemax Ltd., Sheffield (GB)

( * ) Notice: Subject to any disclaimer, the term of this patent is extended or adjusted under 35 U.S.C. 154(b) by 89 days.

(21) Appl. No.: 13/143,460

(22) PCT Filed: Jan. 6, 2010

(86) PCT No.: PCT/GB2010/050012
§ 371 (c)(1),
(2), (4) Date: Jul. 6, 2011

(87) PCT Pub. No.: WO2010/079351
PCT Pub. Date: Jul. 15, 2010

(65) Prior Publication Data
US 2011/0286893 A1 Nov. 24, 2011

(30) Foreign Application Priority Data
Jan. 6, 2009 (GB) .................................. 0900083.7

(51) Int. Cl.
*B01J 19/08* (2006.01)
(52) U.S. Cl.
USPC ............ 422/186.14; 422/186.04; 422/186.07; 210/748.01; 210/748.19; 210/150
(58) Field of Classification Search
CPC ..................... B01J 19/0093; B01J 2219/0093; C01B 13/11
USPC ........... 422/186.104, 186.14, 186.07, 186.04; 210/748.01, 748.19, 150
See application file for complete search history.

(56) References Cited

U.S. PATENT DOCUMENTS

| 3,635,812 A | 1/1972 | Spacil |
| 4,951,168 A | 8/1990 | Harrison |

(Continued)

FOREIGN PATENT DOCUMENTS

| DE | 4008612 A1 | 9/1991 |
| DE | 102005041137 A1 | 3/2007 |

(Continued)

OTHER PUBLICATIONS

Andrew de Mello "on-chip chromatogaraphy: the last twenty years", The royal Society of Chemistry 2002.

(Continued)

*Primary Examiner* — Xiuyu Tai
(74) *Attorney, Agent, or Firm* — Laura M. Lloyd; Jeffrey G. Sheldon; Sheldon Mak & Anderson PC

(57) ABSTRACT

Apparatus for the production of a product gas (eg hydrogen and ozone) comprises: a supply of reactant gas (eg oxygen and steam) (14); a pair of electrodes (24) with a space between them of less than 1 mm (28); a conduit to lead the reactant gas from the source through the space between the electrodes; a power source (26) to apply a voltage across the electrodes to dissociate the reactant gas and ultimately permit formation of product gas; and a conduit (40) to supply the product gas to an outlet. A sterilization unit for water treatment employs such apparatus and includes a fluidic oscillator to oscillate the flow of oxygen and/or ozone, and wherein said outlet comprises a plurality of orifices (42) to be submerged in said water and for the purpose of forming micro bubbles of ozone. An analyzer for detecting large organic molecules in eg air can employ the ozone generator to breakdown the large molecule into simpler and easier-to-detect-and-identify molecules.

24 Claims, 6 Drawing Sheets

(56) References Cited

U.S. PATENT DOCUMENTS

| | | | |
|---|---|---|---|
| 6,299,948 | B1 | 10/2001 | Gherardi et al. |
| 2002/0048539 | A1* | 4/2002 | MacKay .................. 422/186.07 |
| 2003/0007908 | A1 | 1/2003 | Han et al. |
| 2004/0099599 | A1 | 5/2004 | Van Vliet et al. |
| 2005/0226791 | A1 | 10/2005 | Wada et al. |
| 2006/0189168 | A1 | 8/2006 | Sato et al. |
| 2007/0154365 | A1 | 7/2007 | Matsuno |
| 2007/0170371 | A1 | 7/2007 | Dutton et al. |
| 2009/0071910 | A1* | 3/2009 | Ike et al. ........................ 210/748 |

FOREIGN PATENT DOCUMENTS

| | | |
|---|---|---|
| EP | 1403902 A1 | 3/2004 |
| EP | 1548795 A1 | 6/2005 |
| GB | 1482945 A | 8/1977 |
| JP | 9269842 A | 10/1997 |
| JP | 2004197211 A | 7/2004 |
| JP | 2007254223 A | 10/2007 |
| WO | 0000670 A | 1/2000 |
| WO | 2007035216 A1 | 3/2007 |
| WO | 2008053174 A1 | 5/2008 |

OTHER PUBLICATIONS

Leondro Lorenzelli, et al., "Development of a gas chromatograpy silicon-based miscrosystem in clinical diagnostics", Biosensors and Bioelectronics 20 (2005) 1968-1976.

WO/2010/079351 A3 International Search Report dated Feb. 4, 2011.

Anil Agiral, K. Seshan, Leon Lefferts, J.G.E. (Han) Gardeniers "Microplasma Reactors with Integrated Carbon Nanofibers and Tungsten Oxide Nanowires Electrodes"—The American Institute of Chemical Engineers, Topical 5: IMRET-10: 10th International Conference on Microreaction Technology, Apr. 9, 2008.

Peter J. Lindner, Ronald S. Besser "Reforming of J.P.-8 in Microplasmas for Compact SOFC Power"—The American Institute of Chemical Engineers, Topical 5: IMRET-10: 10th International Conference on Microreaction Technology, Apr. 7, 2008.

GB0900083.7 International Search Report dated Jun. 4, 2009.

PCT/GB2009/051661 International Preliminary Report on Patentability and Written Opinion of the International Searching Authority, dated Jun. 14, 2011.

K.H. Becker, K.H. Schoenbach, J.G. Eden "Microplasmas and applications"—The Journal of Physics D. Applied Physics, IOP Publishing, Bristol, GB (Abstract only).

PCT International Preliminary Report on Patentability dated Jul. 12, 2011, International Application No. PCT/GB2010/050012, International filing date, Jan 6, 2010.

* cited by examiner

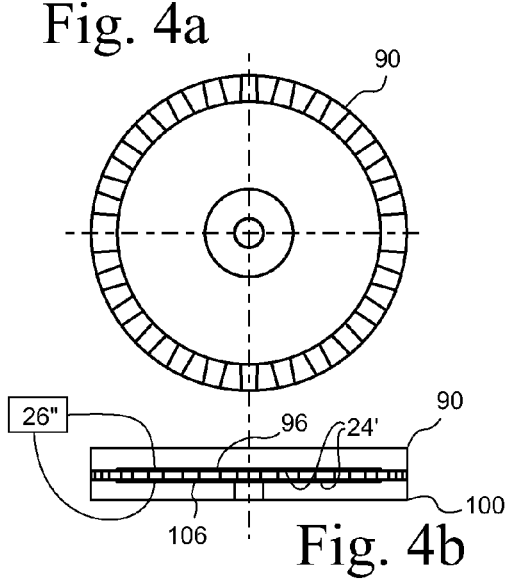
Fig. 4a
Fig. 4b
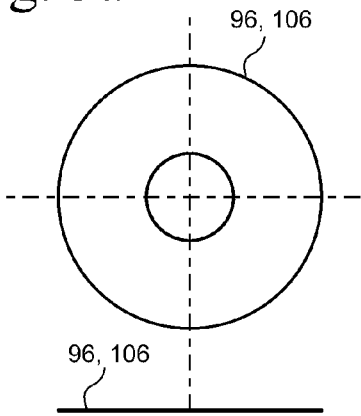
Fig. 5a
Fig. 5b
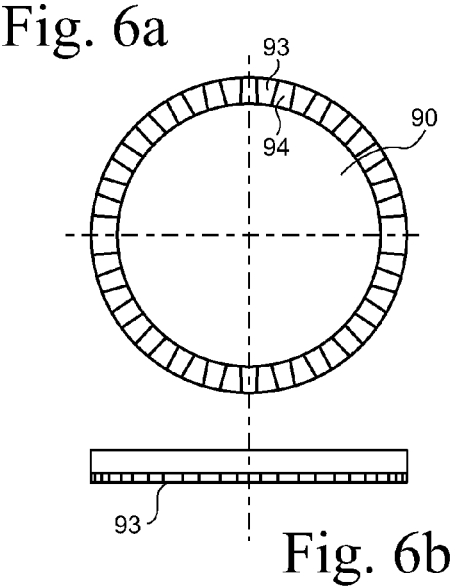
Fig. 6a
Fig. 6b
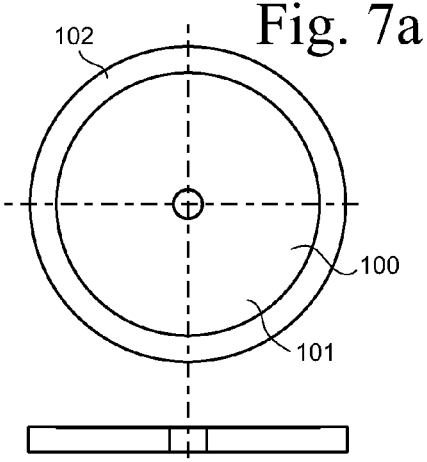
Fig. 7a
Fig. 7b

PLASMA MICROREACTOR APPARATUS, STERILISATION UNIT AND ANALYSER

CROSS-REFERENCE TO RELATED APPLICATIONS

This application is the U.S. national stage of International Application No. PCT/GB2010/050012, filed Jan. 6, 2010 and entitled "PLASMA MICROREACTOR APPARATUS, STERILISATION UNIT AND ANALYSER," which claims priority from Great Britain Application No. 0900083.7, filed Jan. 6, 2009, the contents of which are incorporated in this disclosure by reference in their entirety.

This invention relates to the performance of chemical reactions on a micro scale using plasmas. In particular, it relates to the generation of ozone for several applications, including one on a macro scale, for the cleansing and sterilising of water, for example in sewage treatment applications, and another on a micro scale, for chemical analysis, among other applications. The present invention in another aspect also relates particularly to the production of hydrogen from water and its subsequent separation from its co-product oxygen.

In more general terms, the present invention relates to the optimisation of plasma reactors on the micro scale, whereby certain advantages of the micro scale environment can be exploited, and so that, despite being on the micro scale, large scale production of some products can be achieved.

BACKGROUND

The micro scale is not specifically defined, but, used herein, it means employing dimensions between 1 and 1000 microns. The micro scale is of interest in many environments, particularly in the analytical field where possibly only small quantities of reactants are available.

Plasmas are gases to which an electric field is applied, dissociating molecules of the gas into charged ions. The ions can be employed for a number of purposes although it is a well-recognised property of plasmas that ions are extinguished once they collide with surfaces, for example the surfaces of the container in which the plasma is formed, or the plates of the electrodes. Consequently, containers tend to be large, and plates separated by as large a distance as possible, so that the energy put in to create ions is not lost by ion extinction.

Such large distances have the corollary effect that electric voltages applied by the plates have to be substantial in order to create a sufficiently concentrated electric field to form the desired plasma. Indeed, the high voltage required is frequently the reason why plasmas are not employed in many situations. For example, ozone is produced in plasma, but the cost of production using this technique renders it uneconomic for many purposes, particularly sewage treatment and water sterilisation, which is a relatively low value operation.

Ozone is known to be useful in two applications, at least. A first application is in the sterilisation of water for drinking purposes. Indeed, ozone is the preferred material for water sterilisation in many countries, but not in the UK where economic considerations take precedence. Thus, the less expensive chlorination process is used in the UK to obtain potable water. However, the improved taste of water sterilised with ozone could be achieved if a cost effective method of ozone production was available. This would be especially true if an efficient mechanism for distributing the ozone within the water was also available.

A second application is in a reactor. Ozone is employed to break down unsaturated carbon-carbon bonds of hydrocarbons. This splits large molecules into smaller ones. The smaller molecules can be identified and quantified by other techniques (such as mass spectrometry and chromatography) and this is potentially identifying of the original larger molecule.

There are also many uses of ozone that are economic. For example, ozone is used in the field of medical sterilizers and gas phase atmospheric "cleansers" (the latter removing bacteria, dust and dust mites). These applications use large plasma reactor chambers that are energy intensive.

A method of generating ozone with less power requirements would be desirable. In the field of water treatment, if an economic method of ozone production could be developed, it would also be desirable to have an effective delivery method for the ozone into the water being treated.

Hydrogen is also a useful gas. It can be produced by the plasmolysis of steam. However, the energy employed in its production must not be so high that a good proportion of it is not recoverable later in a hydrogen fuel cell, for instance. Indeed, it is well recognised that production of hydrogen using electricity generated from solar power or other "free" sources is a means of "storing" the electricity for later use, for example when it is wanted but when the solar or wind power have temporarily subsided. It would be desirable to have an efficient production method for hydrogen, as well as a simple separation mechanism to separate it from oxygen, its co-product of plasmolysis of steam.

Microplasma reactors are known [1,2]. Agiral et al [1] concerns reactors to decompose $CO_2$ and relates to the incorporation of nanotubes and nanowires as electrodes. Lindner et al [2] employs microplasmas as a means of reforming hydrocarbons, in particular JP-8 jet fuel, to produce hydrogen for solid oxide fuel cells. However, neither of these papers actually discuss the economics of the proposals.

BRIEF SUMMARY OF THE DISCLOSURE

In accordance with a first aspect of the present invention there is provided ozone apparatus for the production of ozone comprising:
  a supply of a first gas comprising oxygen;
  electrodes with a space between them of less than 1 mm;
  a conduit to lead the oxygen from the source through the space between the electrodes;
  a power source to apply a voltage across the electrodes to dissociate the oxygen and form a second gas comprising ozone; and
  a conduit to supply the ozone to an outlet.

Preferably, said ozone apparatus forms part of a sterilisation unit for water treatment and further comprises a fluidic oscillator to oscillate the flow of said first and/or second gas, and wherein said outlet comprises a plurality of orifices to be submerged in said water and for the purpose of forming micro bubbles of ozone.

In accordance with a second aspect of the present invention there is provided hydrogen apparatus for the production of hydrogen comprising:
  a supply of a third gas comprising steam;
  electrodes with a space between them of less than 1 mm;
  a conduit to lead the steam from the source through the space between the electrodes;
  a power source to apply a voltage across the electrodes to dissociate the steam to form a fourth gas comprising a mixture of oxygen and hydrogen; and
  a conduit to supply the hydrogen and oxygen to an outlet.

Preferably, said hydrogen apparatus further comprises a separation unit in the form of a fluidic oscillator to oscillate the flow of said third and/or fourth gas, and wherein said outlet comprises a plurality of orifices to be submerged in water and for the purpose of forming micro bubbles of said oxygen and hydrogen, whereby said water becomes preferentially enriched with dissolved hydrogen.

For example the arrangements disclosed in WO-A-2008/053174, the contents of which are hereby incorporated herein by reference, might be employed in association with the ozone and hydrogen apparatus described herein.

Thus, preferably, a fluidic diverter is disposed in the second or fourth gas flow, as the case may be, after passage between the electrodes, the diverter being supplied with a constant flow of said gas and having two divergent passages from a jet that receives said supply, whereby the jet can exit through either passage, a control port opening into each passage which, when a flow exits said port, diverts the flow to the other passage.

Alternatively, a fluidic diverter is disposed in the first or third gas flow, as the case may be, before passage between the electrodes, the diverter being supplied with a constant flow of said gas and having two divergent passages from a jet that receives said supply, whereby the jet can exit through either passage, a control port opening into each passage which, when a flow exits said port, diverts the flow to the other passage.

Preferably, in either event, each control port is supplied with a feedback loop from the passage into which the control port opens, whereby flow to each passage oscillates.

Preferably, said supply of oxygen is a supply of air. Preferably, said ozone is a mixture of ozone and unconverted oxygen, and any other inclusions in the oxygen supply.

Where the diverter is before the electrodes, preferably each divergent passage has a said pair of electrodes associated therewith, each converting the pulsating flow in each passage to plasma.

Preferably, each divergent passage is terminated by a rose comprising a first round conductor having a central opening into which said divergent passage opens, a slotted rim, a second round conductor spaced from said first conductor and defining therewith a chamber around said opening and bounded by said rim, the slots in said rim defining channels by which gas passing through said chamber exits the chamber.

Preferably, said rim is defined on the edge of a first circular insulating cover in which is disposed said first conductor, a second circular insulating cover being provided in which is disposed said second conductor, the edge of said second circular insulating cover butting against said rim to close said slots circumferentially and define said channels.

A water sterilisation unit may comprise one or preferably at least two, and most likely a greater plurality of said roses disposed at a depth in the water such that the pressure of gas in the chamber is sufficient at all times to prevent ingress of water into the chamber, and such that micro bubbles of ozone issue from the pulsating flow from said channels.

Hydrogen is twenty-five times more soluble in water than oxygen. Therefore, employing micro bubbles of a mixture of oxygen and hydrogen in water, where the rate of dissolution of a gas in the bubble is dependent on the square of the diameter of the bubble, can result in a relative concentration of oxygen and hydrogen in the bubble when it reaches the surface of approximately 25:1. This means that the hydrogen is relatively concentrated in solution in the water for subsequent extraction and use.

However, in a third aspect, the present invention provides a generalised apparatus for the production of a product gas by plasmolysis of a reactant gas into an intermediate ion and subsequent reaction of said ion to give said product gas, the apparatus comprising:

a supply of said reactant gas;

electrodes with a space between them of between 10 and 1000 microns;

a first conduit to lead the gas from the source through the space between the electrodes;

a power source to apply a voltage V across the electrodes to dissociate the reactant gas to a plasma comprising an intermediate ion; and a second conduit to supply product gas resulting from recombination of intermediate ions to an outlet; wherein the reaction time T to reach 95%, preferably 99%, of the equilibrium conversion of said intermediate ion to said product gas is less than the ambipolar diffusion time $D_t$ for the bulk of the ions to traverse the distance from one electrode to the other, estimated by the relationship $$D_t = d^2/D_a$$

where d is the gap distance between the electrodes, or the conduit in the region of the electrodes, whichever is smaller, and $D_a$ is the ambipolar diffusivity of the plasma.

Ambipolar diffusivity is a well understood quality of a plasma, whose value is dependent on several parameters of the plasma given by the expression $$D_a = D_i(1 + T_e/T_i)$$

where $D_i$ is the diffusivity of the ions and the ratio $T_e/T_i$ is the ratio of electron to ion temperatures. Basically, it is the speed of diffusion of the ions in a neutral field, but multiplied by a factor due to the consequence of the electric field generated by the movement of the electrons of the plasma.

Preferably, the voltage V is an alternating voltage whose frequency f of oscillation is between 10/T and 1/(10T).

Preferably, the frequency f is between 2/T and 1/(2T). A frequency of 1/T appears to equate approximately the reaction period of the system with the energising voltage pulses. The frequency of the alternating voltage may be between 10 and 1000 Hz for a typical system, conveniently about 100 Hz.

The advantage of the present invention in relation to the production of both ozone and hydrogen is based on the realisation that the speed of reaction between oxygen ions to form ozone, (and protons to form hydrogen), is much faster than the rate of extinction of oxygen ions and protons by collision with the walls of the conduit and/or electrodes. Consequently, despite the proximity of the electrodes with respect to one another, (or the walls of the conduit if that is between the electrodes), the production of ozone or hydrogen, as the case may be, is largely unaffected. Furthermore, given the proximity of the electrodes on the micro scale, the voltage needed to provide adequate electric field strength sufficient to dissociate oxygen or water is very much reduced, meaning that the expense of generating and confining high power voltages can be avoided.

Indeed, preferably, the apparatus operates at or about atmospheric pressure, which is also rendered possible by proximity of the electrodes. It is a known quality of plasmas that the minimum voltage at which a gas will dissociate is a function of (Pd), where P is the pressure and d is the separation of the electrodes. In the study of plasmolysis, such relationship is known as the Paschen curve. However, generally, the electrode plates are separated by tens of centimeters and so, in order to restrict the voltage to a manageable level, in the order of thousands of volts, the pressure employed in plasmolysis is near vacuum. Apart from anything, this severely restricts the number of active species present, restricting the yield of such systems, although it does provide the requisite electron density with respect to molecules to be ionised. However, the present inventors have discovered that, in the circumstances defined herein, there is no requirement for near vacuum pressure conditions, nor for substantial voltages. Consequently two significant cost elements of plasmolysis can be avoided, that is to say, the need for vacuum generation equipment on the one hand, and the need for high voltage generation equipment on the other.

Apart form the cost of the former, its avoidance also results in a much larger concentration of reactant gas being present between the electrodes. Also, in respect of the latter, the avoidance of high voltage has the effect of reducing the power consumption, thereby rendering the process energy cost-effective. The requisite electron density is maintained simply because the electric field density can be relatively increased by virtue of the small separation of the electrodes and even at relatively low voltages.

The present invention suggests that power usage may be cut by as much as a factor of ten for the generation of ozone. Indeed, a capacitance-induced discharge at 170V is sufficient to maintain a steady glow in an oxygen fed plasma, operating at 60 Hz. Thus many uses of ozone for commodity chemical treatments (given that ozone is a powerful oxidizing agent) where economically it has not hitherto been viable, may henceforth become economic. Preferably, the voltage is between 100 and 1000V. More preferably, it is between 150 and 450 V.

Accordingly, far from large plasmolysis chambers, the present invention proposes micro scale plasmolysis chambers, at least for reactions that occur with sufficient rapidity to avoid the problems associated with ion extinction on collision with electrodes or container walls.

Moreover, despite operating at a micro scale, the present invention proposes to multiply the apparatus so that the volume of product gas produced can be significant. Thus, in water treatment, the production of ozone using apparatus in accordance with the present invention may be substantial enough to sterilise the water requirements of the general population. In terms of hydrogen production, sufficient hydrogen can be produced using multiple plasmolysis apparatus according to the present invention to "store" the electricity that might be produced by, for example, wind turbines, solar generators, wave generators and the like, and when they are producing more electricity than there is a current demand for at the time of generation.

Put more generally, in another aspect, the present invention provides gas apparatus for the production and separation of product gas comprising:
  a supply of a plasmolysable reactant gas;
  electrodes, with a space between them of less than 1 mm;
  a first conduit to lead the reactant gas from the source through the space between the electrodes;
  a power source to apply a voltage across the electrodes to dissociate the reactant gas to an intermediate ion;
  a second conduit to supply product gas resulting from recombination of intermediate ions to an outlet, wherein the reaction time T to reach 95%, preferably 99%, of the equilibrium conversion of said intermediate ion to said product gas is less than the ambipolar diffusion time $D_t$ for the bulk of the ions to traverse the distance from one electrode to the other, estimated by the relationship $$D_t = d^2/D_a$$

where d is the gap distance between the electrodes, or the conduit in the region of the electrodes, whichever is smaller, and $D_a$ is the ambipolar diffusivity of the plasma;
  a fluidic oscillator in one of said first and second conduits to oscillate at least the flow of product gas from said outlet;
  a source of liquid into which said outlet opens whereby micro bubbles of said product gas are formed in said liquid; wherein said product gas is soluble in said liquid and is arranged so that a majority of the product gas dissolves in the liquid before said bubble reaches the surface of said liquid.

Said reactant gas may be oxygen or steam, in which event said product gas is ozone and hydrogen respectively. In either event, said liquid is preferably water.

Preferably, a drive circuit creates the electric field across the electrodes that generates the plasma, the drive circuit comprising:
  a first stage, to provide a selectable DC voltage v between 1 and 50 volts;
  a second stage, to provide a time signal at said frequency f; and
  a third stage, comprising a transformer supplied with said selectable voltage v via a switch that is switched at said frequency f and producing across said electrodes an alternating voltage at said voltage V and frequency f.

Preferably, the circuit further comprises a fourth stage, comprising an impedance matching network between said first, second and third stages and said electrodes.

Said impedance matching circuit enables maximum power to be delivered to the electrodes at the voltage selected.

Preferably, said impedance matching circuit is a capacitive/inductive/resistive bridge across the electrodes.

Preferably the first stage is AC mains driven and comprises a voltage dropping transformer and rectifying bridge supplying a voltage regulator whose output is said selectable voltage v.

In another application, where size is also a significant factor, said apparatus comprises part of an analyser, whereby a supply of gas to be analysed is mixed with ozone generated by the apparatus to break down complex organic molecules involving unsaturated carbon-carbon bonds and detecting quantifiably and identifying simpler carbon molecules and/or the level of ozone generated and used up, to identify the original complex organic molecules.

Such an analyser could be employed to detect toxic gases. Gas analyzers currently employed for chemical plant safety. The present invention to adds complex organic molecules to the list of detectable molecules from an integrated sensor system. Plasma sensors already exist that cleave molecules, almost indiscriminately, but the spectrograph (from fibre optic spectrometry) can be data mined for signatures/fingerprints of complex organic molecules. However, the likelihood of many false positives limits the application, since the range of organic molecules that have the same functional groups re-arranged differently is vast. Ozonolysis, on the other hand provides a clearer "footprint" of the original molecule by virtue of its cleaving molecules only at particular points. Counting the pieces in the footprint then provides a different set of information. The more different sets of information that are obtained, of course, leads to fewer false positives, which are the major problem with current gas detectors/alarms.

The analyser may include means to detect the quantity of ozone generated by the apparatus and remaining un-reacted.

Preferably the system includes an alarm when complex molecules of a particular character are detected. Such molecules may comprise elements of explosives and/or elements of illicit materials such as drugs.

BRIEF DESCRIPTION OF THE DRAWINGS

Embodiments of the invention are further described hereinafter, by way of example, with reference to the accompanying drawings, in which:

FIGS. 4a,b, 5a,b, 6a,b, and 7a,b are plan and side views respectively of components of the rose of FIG. 3;

FIG. 8b is the detail B in FIG. 8a.

DETAILED DESCRIPTION

Figure 1:
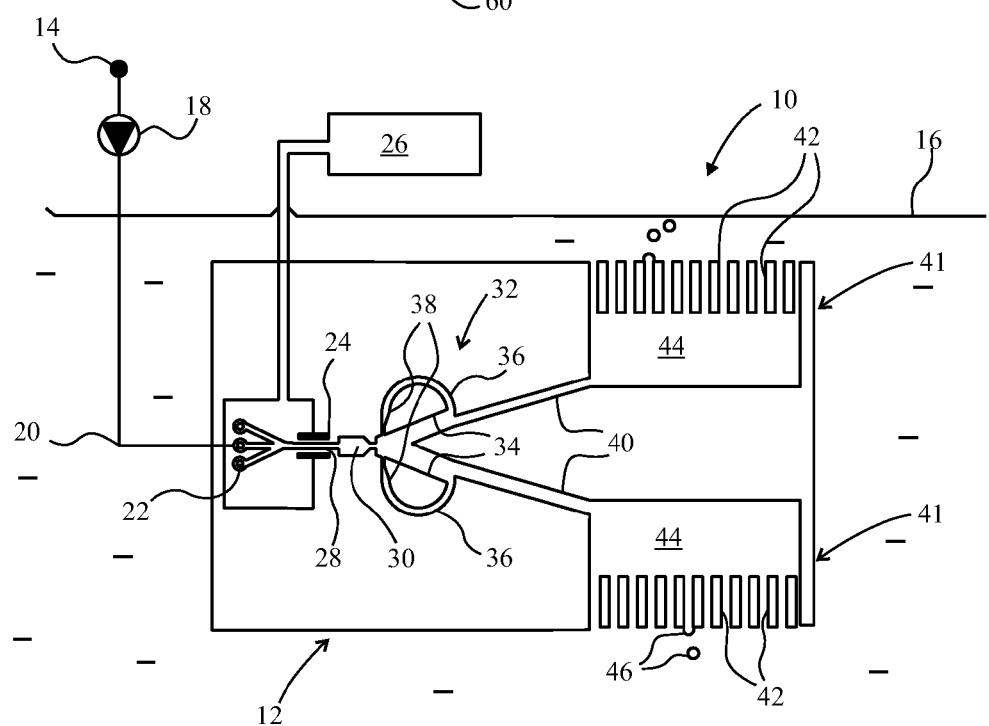
FIG. 1 is a schematic illustration of a water sterilisation unit in accordance with the present invention.

In FIG. 1, a water sterilisation unit 10 comprises an under water ozone bubble generator 12 supplied with gas from a source 14 located above water level 16. A pump 18 pressurises the gas, which is either pure oxygen or, preferably, air including oxygen. A conduit 20 leads the oxygen/oxygen-containing-air to the ozone generator 12, where it enters any one of three ports 22 before passing through a chamber 28 between two electrodes 24. Electrodes 24 are contained within the unit 12, which is sealed to prevent the ingress of water. The electrodes 24 are supplied from the surface by an impedance matching network 26 described further below. The gas enters a chamber 28 at about atmospheric pressure between the electrodes 24 and is ionised to produce plasma therein. A distinct glow is produced having the absorption spectrum of ozone, showing that the plasma does indeed convert the oxygen in the gas supply 14 to ozone.

In any event, the output from the chamber 24 is a supply of gas and it exits a jet 30, which is a supply port of a fluidic diverter 32. The gas exiting jet 30 adheres to one of two walls 34 by the coanda affect. However, after a moment's flow attached to either wall, a branch 36 feeds back some of the flow to the relevant one of a pair of control ports 38. Flow from either port 38 that detaches the flow from the wall 34 in which the port 38 exits, and diverts that flow to the other wall 34 against which it next adheres. Accordingly, from each output 40 of the diverter 32 there is a pulsating flow of gas that is directed to a bubble generator 41. The outputs 40 each supply a separate series of openings 42 in the bubble generators 41, protected by large volume plenum chambers 44 so that bubbles 46 exit all the openings 42 side by side. By virtue of the pulsating flow, the bubbles break off at a much smaller volume than would otherwise be the case. Further details of the bubble generation aspect of the present invention can be found in WO-A-2008/053174, as mentioned above.

Figure 2:
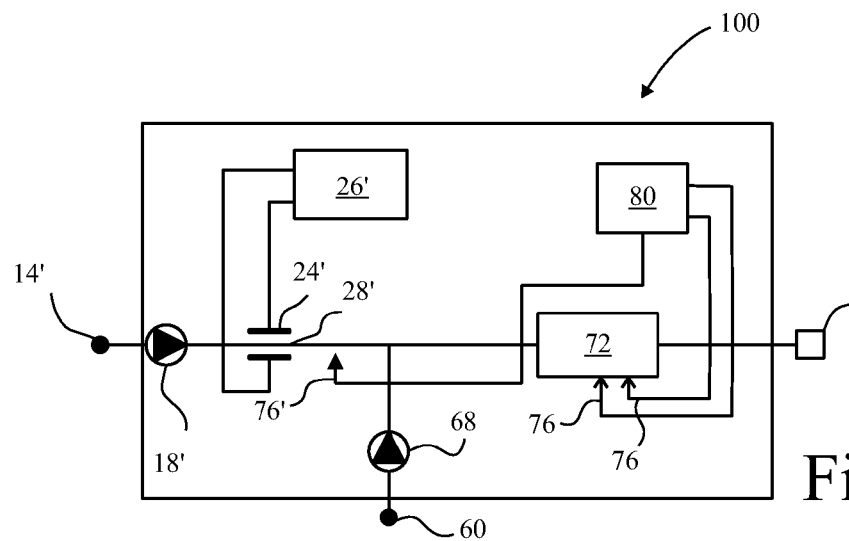
FIG. 2 is a schematic illustration of an analyser in accordance with the present invention.
Figure 9:
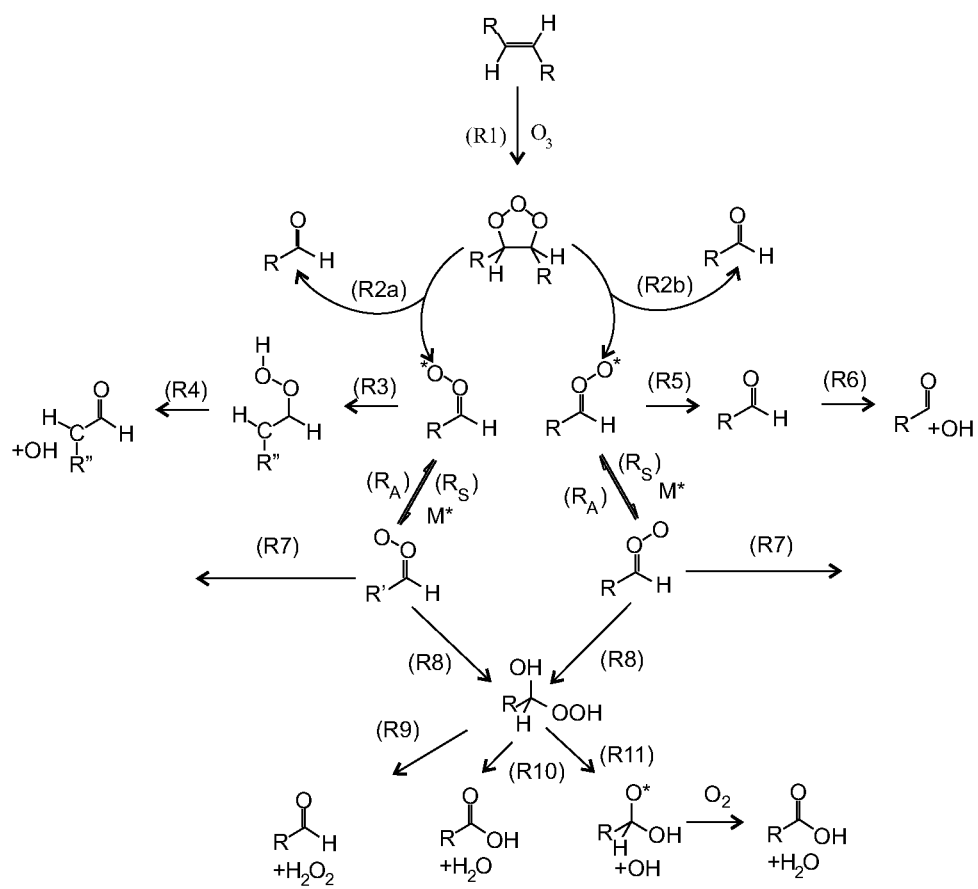
FIG. 9 is a schematic of typical ozonolysis reactions with an alkene.

Turning to FIG. 2, an analyser 100 comprises a supply 14' of oxygen or oxygen containing gas fed by a pump 18' at approximately atmospheric pressure into a chamber 28' between electrodes 24'. The electrodes 24' are supplied by an impedance matching network 26'. The ozone containing output is mixed with gas to be analysed derived from a source 60 and supplied by a pump 68. The mixture is supplied by a conduit 70 to a reaction chamber 72 and thence to an exit vent 74. Within the reaction chamber 72 various analyses are performed on the reaction mixture via probes 76. The results of which analyses are fed to a processor 80 that, in real time, detects, identifies and quantifies simple carbon molecules and compares the relative quantities of those detected against known relative quantities derived from particular complex molecules, so as to potentially identify a complex molecule contained in the gas sample 60. FIG. 9 illustrates the typical reaction sequence of an alkene with ozone and the potential outcomes depending on the nature of the R and R' groups in the initial molecule.

Figure 10:
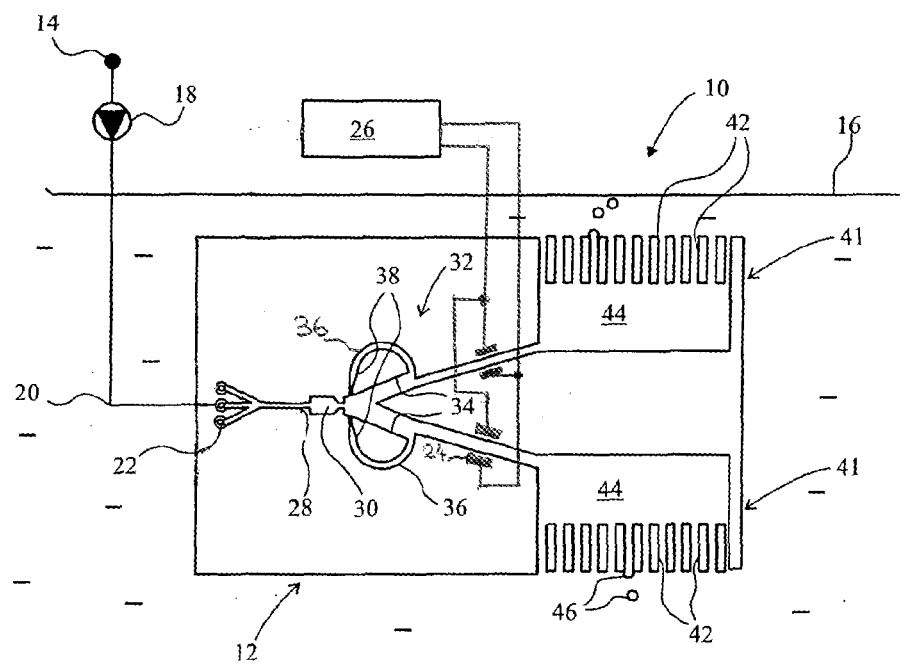
FIG. 10 is a schematic illustration of a water sterilisation unit in accordance with the present invention.

In an alternate embodiment, shown in FIG. 10, the fluidic diverter 32 is disposed in the gas flow before it passes between the electrodes 24. The diverter 32 is supplied with a constant flow of gas and has two divergent branches 36 from a jet 30 that receives the supply of gas. The gas from the jet 30 can exit through either branch 36. When a flow exits the port 38, the flow of gas is diverted to the other branch 36.

One of the probes 76 may comprise orange light (at about 600 nanometers) emitted from integrated LEDs, and a detector therefore. Such light is absorbed by ozone and therefore is indicative of the ozone left unreacted in the reaction chamber 72. This is also indicative of the concentration of reactive compounds in the sample 60. Indeed, a second ozone detector probe 76' may be provided at the output of the plasma chamber 28' so that the input quantity of ozone is known.

Fibre optic spectrometry provides a reliable means of quantifying the fragments of the target molecule cleaved by ozonolysis, as does mass spectrometry. Potentially the pieces could also be characterized in the gaseous phase by ion mobility chromatography or gas chromatography. Photodetectors can readily be embedded in portable integrated sensors, and gas chromatography on microchips has been reported by researchers at Imperial College London [3,4].

However, a particularly simple arrangement (not shown) employs the same source 14' of gas for ozone generation as it does for sampling gas to be analysed. For example, the analyser 100 may be placed in an airport security zone, or other area to be monitored. Molecules of, or associated with, explosives or other illicit materials (such as drugs and the like) may evolve from passengers of their belongings into the atmosphere, and may thence be detected.

In this event, the processor 80 notes an average baseline quantity of ozone produced by the plasma chamber 28' and assumes that any variation thereof detected by probe 76 is caused by reaction with complex molecules in the air sample. Consequently, the analyser becomes self-calibrating over time.

In the aforementioned embodiments, the electrodes may be about 800 microns apart and about 1 centimeter long. Indeed, they could be part of a bespoke microchip and was microfabricated by electrodeposition of copper on the sidewalls at the center of the microchannel over a length of 1 cm. Masking precludes deposition elsewhere on the microchannel surfaces, particularly the microchannel floor. The fabrication was the modification of a standard base Micronit chip produced by MICRONIT MICROFLUIDICS BV, of the Netherlands.

Figure 3:
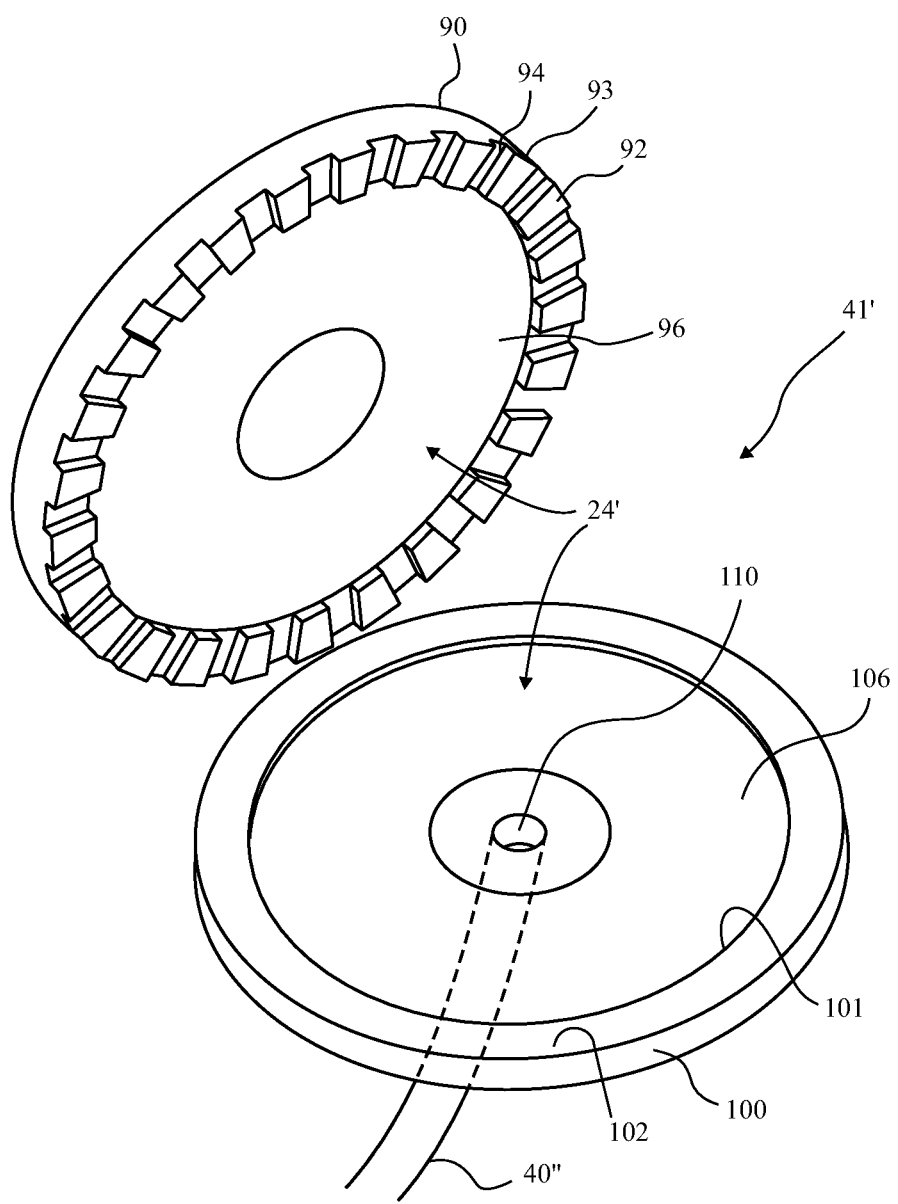
FIG. 3 is an illustration of a rose for use in a sterilisation unit similar to that shown in FIG. 1.

Turning to FIG. 3, an alternative, preferred arrangement for the ozone generator 12 is where the electrodes 24 are built into the bubble generator 41', in the form of a rose. Here, a round cover 90 is constructed from insulating material and is provided with a slotted rim 92 in which there are numerous slots 94 disposed around the periphery of the of the rim 92.

Within the rim 92 is disposed a thin annular disc-like conductor 96 that forms one of the electrodes 24'. A second circular cover 100 has a plain rim 102, but contains a second annular conductor disc 106. The cover 100 is provided with a central aperture 110 to receive a supply of pulsating oxygen or oxygen-containing-air from one of two branches 40' of a fluidic diverter (not shown).

In use, covers 90,100 are butted against one another, with the slotted rim 92 abutting the plain rim 102, and thereby circumscribing a plurality of outwardly radiating channels 94. The height of the teeth 93 defines the width of the slots/channels 94 and is such that the separation of the conductors 96,106 is less than 1 millimeter. Electrical connections (not shown) connect the matched impedance network (not shown) to the conductors 96,106 so that a plasma develops in the space between them. Because of the large plenum defined by plasma chamber 28 between the electrodes 96,106 the pressure behind each of the channels defined by the slots 94 is equal. This ensures that bubble generation is even around the periphery of the rose 41'.

As shown in FIGS. 4a,b, 5a,b, 6a,b and 7a,b the covers 90,100 have an outside diameter of about 36 millimeters, with the rim having an internal diameter of 30 millimeters. Thus the length of the channels produced by the slots 92 are about 3 millimeters in length. The height of the teeth 93 is about 0.8 millimeters, so this represents the separation between the electrodes 96,106. Indeed, the cover 100 has a shallow pit 101 of about 0.2 millimeters depth, which is the same as the thickness of the electrodes 96,106.

These dimensions are purely exemplary and are not intended to limit the invention.

Figure 8A:
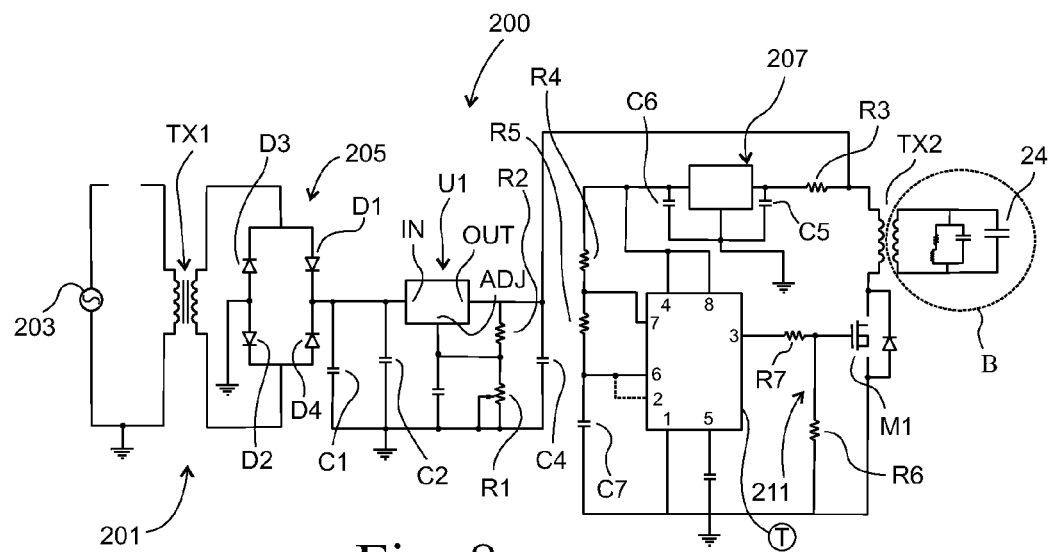
FIG. 8a is a circuit diagram of an impedance matching network for use in powering the electrodes of the systems shown in FIGS. 1 and 2.

A suitable plasma source 200 and circuit therefor is shown in FIG. 8 and can be broken down into three major stages:

A first stage 201 is a DC converter stage in which mains power is converted to DC. The mains power 203 is decreased from 220 VAC down to about 18 VAC by the transformer TX1, and then rectified by a full wave bridge rectifier 205 formed by the array of heavy duty, general purpose 1N4148 power diodes (D1, D2, D3, and D4). The train of DC-like pulses from the bridge rectifier is filtered by a large electrolytic capacitor C1 and fed to a voltage regulator U1 (eg of LM338T type) through its "In" pin. The choice of a large capacitor makes for a well-rectified low ripple voltage. The output from the regulator (at its "Out" pin) is adjusted from 1.2 to 28 VDC via a 4.7 KΩ potentiometer R1 connected to the "Adj" pin of the regulator U1. As R1 increases in resistance the output voltage increases and, thus, the plasma discharge inter-electrode voltage can be controlled, as explained further below.

Capacitor C2 is placed near the voltage regulator just as a precautionary measure. It filters out transient noise that could be induced by stray magnetic fields. Capacitor C4 improves the transient response at high frequencies.

A second stage 207 is an oscillator stage, in which the output voltage from the DC stage 201 is fed to a 12 VDC voltage regulator U2 (of type LM7812) via resistor R3. Capacitors C5 and C6 are placed near the chip U2 as recommended in the manufacturer's datasheet. Regulator U2 supplies a 555 timer T, to its input (pin 8), with a constant 12 VDC (regardless of the output of stage 200). The arrangement around the 555 timer is realized according to the topology recommended by the manufacturer's datasheet, and the values of resistors R4 and R5 and capacitor C7 are calculated for a working frequency around 30 KHz and 50% duty cycle.

A third stage 209 is an elevation stage, in which the signal output from pin 3 of the timer T is divided by a voltage divider 211 formed by resistors R6 and R7 to provide the gate signal to a power MOSFET M1 (of type IRFZ34) which switches current to a step up transformer TX2. When the MOSFET M1 switches on and off the current through the primary winding of TX2 induces a voltage on the secondary side at the level, specified by the turns ratio of the transformer and the voltage output from stage 201, and this is applied across the electrode plates 24.

Figure 8B:
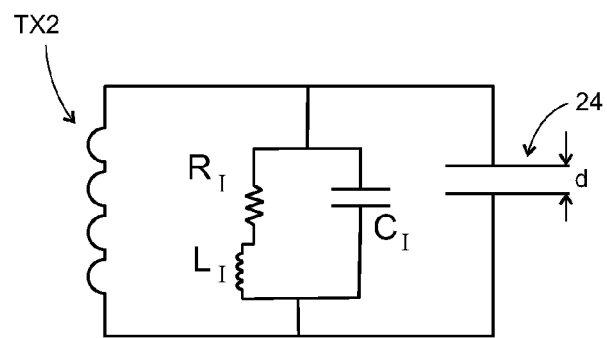

Finally, the output signal from the source 200 is matched in impedance to the plasma reactor by circuit 213, shown in more detail in FIG. 8b. That comprises a resistance $R_I$, inductance $L_I$ and capacitance $C_I$ and the arrangement matches the impedance of the electrodes 24 with that of the circuit 200, whereby maximum efficiency and power transfer is achieved. The output voltage can be elevated from 28 VDC up to 1.5 KVAC with a frequency of oscillation between 1 and 1000 Hertz, and the current output is around 10 mA.

The electrodes 24 are separated by a distance d which obviously is relevant with respect to the field strength between them, and hence the development of the plasma. However, if the conduit carrying the reactant gas and plasma is disposed between the plates, as shown in FIGS. 1 and 2, then the dimension d to be used in the relationship $D_t=d^2/D_a$ is not the distance between the electrodes, but rather the internal dimension of the conduit. The reason for this is that ions will extinguish on the walls of the conduit, so that the reaction time T to reach the equilibrium conversion of the intermediate ions to the product gas needs to be less than the ambipolar diffusion time $D_t$ given by the above relationship using the dimension of the conduit, and not the electrodes. $D_t$ is the ambipolar diffusion time for the bulk of the ions to traverse the distance from one electrode to the other. $D_a$ is the ambipolar diffusivity of the plasma. Incidentally, for practical purposes, 95%, or preferably 99%, equilibrium conversion is employed as the target limit, since 100% equilibrium is probably never reached.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

REFERENCES

1. Anil Agiral, K. Seshan, Leon Lefferts, J. G. E. (Han) Gardeniers "Microplasma Reactors with Integrated Carbon Nanofibers and Tungsten Oxide Nanowires Electrodes"—The American Institute of Chemical Engineers, Topical 5: IMRET-10: 10th International Conference on Microreaction Technology, Apr. 9, 2008.
2. Peter J. Lindner, Ronald S. Besser "Reforming of J.P.-8 in Microplasmas for Compact SOFC Power"—The American Institute of Chemical Engineers, Topical 5: IMRET-10: 10th International Conference on Microreaction Technology, Apr. 7, 2008
3. de Mello, A. J., *On-chip chromatography: the last twenty years*, Lab on A Chip, 2002, Vol: 2, Pages: 48N-54N, ISSN: 1473-0197.
4. Leandro Lorenzellia, Antonella Benvenuto, Andrea Adamia, Vittorio Guarnieria, Benno Margesina, Viviana Mullonia, Donato Vincenzi, "Development of a gas chromatography silicon-based microsystem in clinical diagnostics" Biosensors and Bioelectronics 20 (2005) 1968-1976

The invention claimed is:

1. Gas apparatus for the production of product gas, the apparatus comprising:
   a gaseous supply of a plasmolysable reactant gas;
   electrodes, with a space between them of less than 1 mm;
   a first conduit to lead the reactant gas from the gaseous supply through the space between the electrodes;
   a power source to apply a voltage across the electrodes to dissociate the reactant gas to an intermediate ion;
   a second conduit to supply product gas resulting from recombination of intermediate ions to an outlet, wherein the reaction time T to reach 95%, preferably 99%, of the equilibrium conversion of said intermediate ion to said product gas is less than the ambipolar diffusion time $D_t$ for the bulk of the ions to traverse the distance from one electrode to the other, estimated by the relationship $$D_t = d^2/D_a$$

where d is the gap distance between the electrodes, or the conduit in the region of the electrodes, whichever is smaller, and $D_a$ is the ambipolar diffusivity of the plasma;
   a fluidic oscillator in one of said first and second conduits to oscillate at least the flow of product gas from said outlet;
   a liquid into which said outlet opens whereby micro bubbles of said product gas are formed in said liquid; wherein
   said product gas is arranged so that a majority of the product gas dissolves before said micro bubbles reach the surface of said liquid and the outlet comprises a plurality of orifices to be submerged in the liquid for the purpose of forming micro bubbles of the product gas.

2. Gas apparatus as claimed in claim 1, in which said reactant gas is oxygen or steam, and said product gas is respectively ozone or hydrogen.

3. Gas apparatus as claimed in claim 1, in which said liquid is water.

4. Gas apparatus as claimed in claim 1, for the production of ozone comprising:
   said supply of a plasmolysable reactant gas is a supply of a first gas comprising oxygen;
   said product gas is a second gas comprising ozone.

5. Gas apparatus as claimed in claim 1, for the production of hydrogen comprising:
   said supply of a plasmolysable reactant gas is a supply of a third gas comprising steam;
   said product gas is a fourth gas comprising a mixture of oxygen and hydrogen.

6. Apparatus as claimed in claim 5, in which said gas apparatus further comprises a separation unit comprising said source of liquid being water.

7. Apparatus as claimed in claim 4, in which said fluidic oscillator is a fluidic diverter disposed in the second gas flow after passage between the electrodes, the diverter being supplied with a constant flow of said second gas and having two divergent passages from a jet that receives said supply, whereby the jet can exit through either passage, a control port opening into each passage which, when a flow exits said port, diverts the flow to the other passage.

8. Apparatus as claimed in claim 5, in which said fluidic oscillator is a fluidic diverter disposed in the fourth gas flow after passage between the electrodes, the diverter being supplied with a constant flow of said gas and having two divergent passages from a jet that receives said supply, whereby the jet can exit through either passage, a control port opening into each passage which, when a flow exits said port, diverts the flow to the other passage.

9. Apparatus as claimed in claim 7, in which one or more of the divergent passages is terminated by a rose comprising a first round conductor electrode having a central opening into which said divergent passage opens, a slotted rim, a second round conductor electrode spaced from said first conductor and defining therewith a chamber around said opening and bounded by said rim, the slots in said rim defining channels by which gas passing through said chamber exits the chamber, plasma being formed in said channels.

10. Apparatus as claimed in claim 9, in which said rim is defined on the edge of a first circular insulating cover in which is disposed said first conductor, a second circular insulating cover being provided in which is disposed said second conductor, the edge of said second circular insulating cover butting against said rim to close said slots circumferentially and define said channels.

11. Apparatus as claimed in claim 4, in which a fluidic diverter is disposed in the first gas flow before passage between the electrodes, the diverter being supplied with a constant flow of said first gas and having two divergent passages from a jet that receives said supply, whereby the jet can exit through either passage, a control port opening into each passage which, when a flow exits said port, diverts the flow to the other passage.

12. Apparatus as claimed in claim 5, in which a fluidic diverter is disposed in the third gas flow before passage between the electrodes, the diverter being supplied with a constant flow of said gas and having two divergent passages from a jet that receives said supply, whereby the jet can exit through either passage, a control port opening into each passage which, when a flow exits said port, diverts the flow to the other passage.

13. Apparatus as claimed in claim 11, in which the control port opening into each passage is supplied with a feedback loop from the passage into which the control port opens, whereby flow to each passage oscillates.

14. Apparatus as claimed in claim 4, in which said supply of oxygen is a supply of air.

15. Apparatus as claimed in claim 4, in which said ozone is a mixture of ozone and unconverted oxygen, and any other inclusions in the oxygen supply.

16. A water sterilisation unit, comprising apparatus as claimed in claim 7, where the output of the apparatus is arranged to bubble through water to be sterilised to form micro-bubbles.

17. The water sterilisation unit as claimed in claim 16 in which one or more of the divergent passages is terminated by a rose comprising a first round conductor electrode having a central opening into which said divergent passage opens, a slotted rim, a second round conductor electrode spaced from said first conductor and defining therewith a chamber around said opening and bounded by said rim, the slots in said rim defining channels by which gas passing through said chamber exits the chamber, plasma being formed in said channels, the unit comprising a plurality of said roses disposed at a depth in the water such that the pressure of gas in the chamber is sufficient at all times to prevent ingress of water into the chamber, and such that micro bubbles of ozone issue from the pulsating flow from said channels.

18. Apparatus as claimed in claim 1, in which a drive circuit creates the electric field across the electrodes that generates the plasma, wherein the drive circuit comprises:
 a voltage regulator to provide a DC voltage v between 1 and 50 volts;
 a timer to provide a time signal at frequency $f_1$; and
 a transformer supplied with said selectable voltage v via a switch that is switched at said frequency $f_1$ and producing across said electrodes an alternating voltage at voltage $V_1$ and frequency $f_1$.

19. Apparatus as claimed in claim 18, wherein said voltage $V_1$ is the voltage V.

20. Apparatus as claimed in claim 18, wherein the voltage V is an alternating voltage whose frequency f of oscillation is between 10/T and 1/(10T), wherein said frequency $f_1$ is the frequency f.

21. Apparatus as claimed in claim 12, wherein the circuit further comprises a fourth stage, comprising an impedance matching network between said first, second and third stages and said electrodes.

22. Apparatus as claimed in claim 21, wherein said impedance matching circuit is a capacitative/inductive/resistive bridge across the electrodes.

23. Apparatus as claimed in claim 22, in which the first stage is AC mains driven and comprises a voltage dropping transformer and rectifying bridge supplying a voltage regulator whose output is said selectable voltage v.

24. Apparatus as claimed in claim 11, in which each divergent passage has a pair of electrodes associated therewith, each converting the pulsating flow in each passage to plasma.

\* \* \* \* \*